US011960874B2

(12) United States Patent
Yamaguchi et al.

(10) Patent No.: US 11,960,874 B2
(45) Date of Patent: Apr. 16, 2024

(54) CONTROL SYSTEM, MOBILE OBJECT, SERVER, CONTROL METHOD AND COMPUTER-READABLE STORAGE MEDIUM

(71) Applicant: HONDA MOTOR CO., LTD., Tokyo (JP)

(72) Inventors: Kohei Yamaguchi, Tokyo (JP); Tomoaki Taki, Tokyo (JP); Koichiro Nakamura, Tokyo (JP); Shoichi Kuraoka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 291 days.

(21) Appl. No.: 17/572,658

(22) Filed: Jan. 11, 2022

(65) Prior Publication Data

US 2022/0222061 A1 Jul. 14, 2022

(30) Foreign Application Priority Data

Jan. 14, 2021 (JP) .................................. 2021-004564

(51) Int. Cl.
*G06F 8/65* (2018.01)
(52) U.S. Cl.
CPC ...................................... *G06F 8/65* (2013.01)
(58) Field of Classification Search
USPC ........................................................ 717/171
See application file for complete search history.

(56) References Cited

U.S. PATENT DOCUMENTS 11,507,365 B2 * 11/2022 Itatsu ...................... H04W 4/44
2008/0071447 A1 3/2008 Uraki
(Continued)

FOREIGN PATENT DOCUMENTS

| JP | 2004110460 A | 4/2004 |
| JP | 2020027666 A | 2/2020 |

(Continued)

OTHER PUBLICATIONS

Office Action issued for counterpart Japanese Application No. 2021-004564, issued by the Japanese Patent Office dated Dec. 6, 2022 (drafted on Nov. 30, 2022).

(Continued)

*Primary Examiner* — Qing Chen
*Assistant Examiner* — Clint Thatcher

(57) ABSTRACT

A control system comprises a mobile object control unit for controlling a mobile object; an update control unit for controlling reception of an update program of the mobile object control unit from a server and controlling update of the mobile object control unit by the program; an acquisition unit for acquiring reception information indicating a communication manner for receiving from the server for each program; and a communication control unit for controlling receiving the program from the server, based on the reception information, wherein the acquisition unit is for, when both a first update program and a second update program received after update by the first update program is executed have not been received, acquiring information about change of reception information of the first update program, and the communication control unit is for controlling receiving the first update program based on the information about change acquired by the acquisition unit.

18 Claims, 12 Drawing Sheets

(56) References Cited

U.S. PATENT DOCUMENTS

| | | | |
|---|---|---|---|
| 2019/0114162 A1* | 4/2019 | Izumi | G05B 13/048 |
| 2019/0265966 A1* | 8/2019 | Shimomura | B60R 16/023 |
| 2020/0114927 A1 | 4/2020 | Yokota | |
| 2020/0361369 A1 | 11/2020 | Yamaguchi | |
| 2021/0011709 A1* | 1/2021 | Itatsu | B60R 16/02 |
| 2021/0173628 A1* | 6/2021 | Aiba | H04L 67/12 |
| 2021/0191661 A1 | 6/2021 | Harata | |
| 2022/0146278 A1 | 5/2022 | Takeda | |
| 2023/0362725 A1* | 11/2023 | Condoluci | H04W 76/00 |

FOREIGN PATENT DOCUMENTS

| | | |
|---|---|---|
| WO | 2017134816 A1 | 8/2017 |
| WO | 2020070532 A1 | 4/2020 |

OTHER PUBLICATIONS

Office Action issued for counterpart Chinese Application 202111497944.0, issued by The State Intellectual Property Office of People's Republic of China dated May 10, 2023.

Office Action issued for counterpart Chinese Application 202111497944.0, issued by The State Intellectual Property Office of People's Republic of China dated Oct. 18, 2023.

\* cited by examiner

| PID | DEGREE OF IMPORTANCE | COMMUNICATION MANNER | UPPER LIMIT VALUE | SIZE |
|---|---|---|---|---|
| P1 | 0 | NOT SPECIFIED | 50M | 50M |
| P2 | 1 | NOT SPECIFIED | - | 80M |

*FIG.4*

| PID | DEGREE OF IMPORTANCE | COMMUNICATION MANNER | UPPER LIMIT VALUE | SIZE |
|---|---|---|---|---|
| P1 | 0 | NOT SPECIFIED | 50M | 50M |
| P2 | 1 | NOT SPECIFIED | - | 80M |
| P3 | 0 | WLAN | - | 100M |
| P4 | 0 | NOT SPECIFIED | - | 20M |

FIG.6

| VEHICLE ID | PID |
|---|---|
| V1 | P2 |
| V2 | P4 |
| . . . | . . . |

FIG.7

| PID | DEGREE OF IMPORTANCE | COMMUNICATION MANNER | UPPER LIMIT VALUE | SIZE |
|---|---|---|---|---|
| P5 | 1 | NOT SPECIFIED | 250M | 80M |

*FIG.8*

| PID | DEGREE OF IMPORTANCE | COMMUNICATION MANNER | UPPER LIMIT VALUE | SIZE |
|---|---|---|---|---|
| P3 | 0 | NOT SPECIFIED | - | 20M |
| P4 | 0 | NOT SPECIFIED | - | 100M |
| P5 | 1 | NOT SPECIFIED | 250M | 80M |

CONTROL SYSTEM, MOBILE OBJECT, SERVER, CONTROL METHOD AND COMPUTER-READABLE STORAGE MEDIUM

The contents of the following Japanese patent application(s) are incorporated herein by reference: NO. 2021-004564 filed on Jan. 14, 2021

BACKGROUND

1. Technical Field

The present invention relates to a control system, a mobile object, a server, a control method and a computer-readable storage medium.

2. Related Art

Patent Document 1 discloses, as an ECU for a vehicle, an ECU capable of rewriting an application program.

PRIOR ART DOCUMENT

Patent Document

Patent Document 1: Japanese Patent Application Publication No. 2020-27666

BRIEF DESCRIPTION OF THE DRAWINGS

FIG. 4 shows a data structure of reception information, which is transmitted to a vehicle 20 by a server 70, in a table form.

FIG. 6 shows a data structure of management information for the server 70 to manage an update program, which is transmitted to the vehicle 20, in a table form.

FIG. 7 shows a data structure of completion information for the server 70 to manage a transmission state of the update program in the vehicle 20, in a table form.

FIG. 8 shows a data structure of reception information relating to a new update program for the vehicle 20, which is transmitted by the server 70.

FIG. 10 shows an example of the communication manner change information, in a table form.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
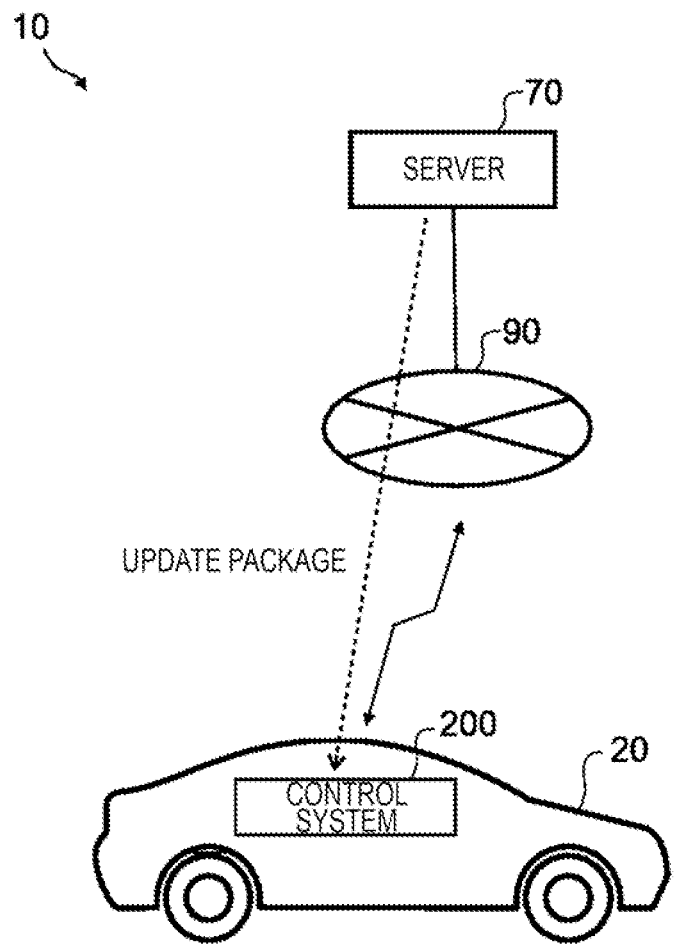
FIG. 1 schematically shows an update system 10 according to one embodiment.

FIG. 1 schematically shows an update system 10 according to one embodiment. The update system 10 includes a vehicle 20 and a server 70. The vehicle 20 comprises a control system 200. The control system 200 is responsible for control of the vehicle 20 and communication with the server 70 via a communication network 90. The communication network 90 includes an IP network such as the Internet, a P2P network, a dedicated line including a VPN, a virtual network, a mobile communication network, and the like.

In the vehicle 20, the control system 200 comprises a plurality of ECUs (Electronic Control Units) configured to perform control of the vehicle 20. The control system 200 is configured to acquire an update program of the ECU provided to the control system 200 from an outside. For example, the control system 200 is configured to receive an update program, which is transmitted from the server 70, via the communication network 90 by wireless communication. The control system 200 is configured to cause the update program to reprogram the ECU provided to the control system 200. The reprogramming is performed for upgrade and the like of functions of the ECU provided to the control system 200. In this way, the control system 200 is configured to update the ECU by reprogramming the ECU by OTA (Over The Air). In the present embodiment, updating a device such as the ECU by the update program is referred to as 'program update'.

The control system 200 can receive the update program from the server 70 by mobile communication and wireless LAN communication. The server 70 is configured to transmit reception information for specifying, for each update program, a communication manner for receiving the update program to the vehicle 20. For example, the reception information includes one of 'not specified' and 'WLAN'. 'Not specified' indicates that both communication manners of wireless LAN and mobile communications are allowed as the communication manner for receiving the update program. 'WLAN' indicates that only wireless LAN communication is allowed as the communication manner for receiving the update program and mobile communication is prohibited.

The control system 200 can receive the update program by wireless LAN communication when the control system is in a situation where it can connect to a wireless access point such as a home wireless router and a public wireless LAN access point. Therefore, in a case where there is an update program for which 'WLAN' is specified, the control system 200 cannot receive the update program until the control system becomes in a situation where it can connect to the wireless access point. For this reason, the program update by the update program for which 'WLAN' is specified may be delayed. As a result, for example, when it becomes necessary to provide an important update program that should be applied after performing a program update by the update program for which 'WLAN specified' is specified, a state where the important update program is not applied over a long period may continue.

Therefore, for example, when it becomes necessary to provide an important update program to the control system 200, the server 70 transmits, to the control system 200, change information indicating that the communication manner for receiving the update program specified in the reception information transmitted already is to be changed. When the control system 200 receives the change information, the control system receives the update program for which 'WLAN' is specified, by mobile communication. This allows applying of the update program to be promoted.

Figure 2:
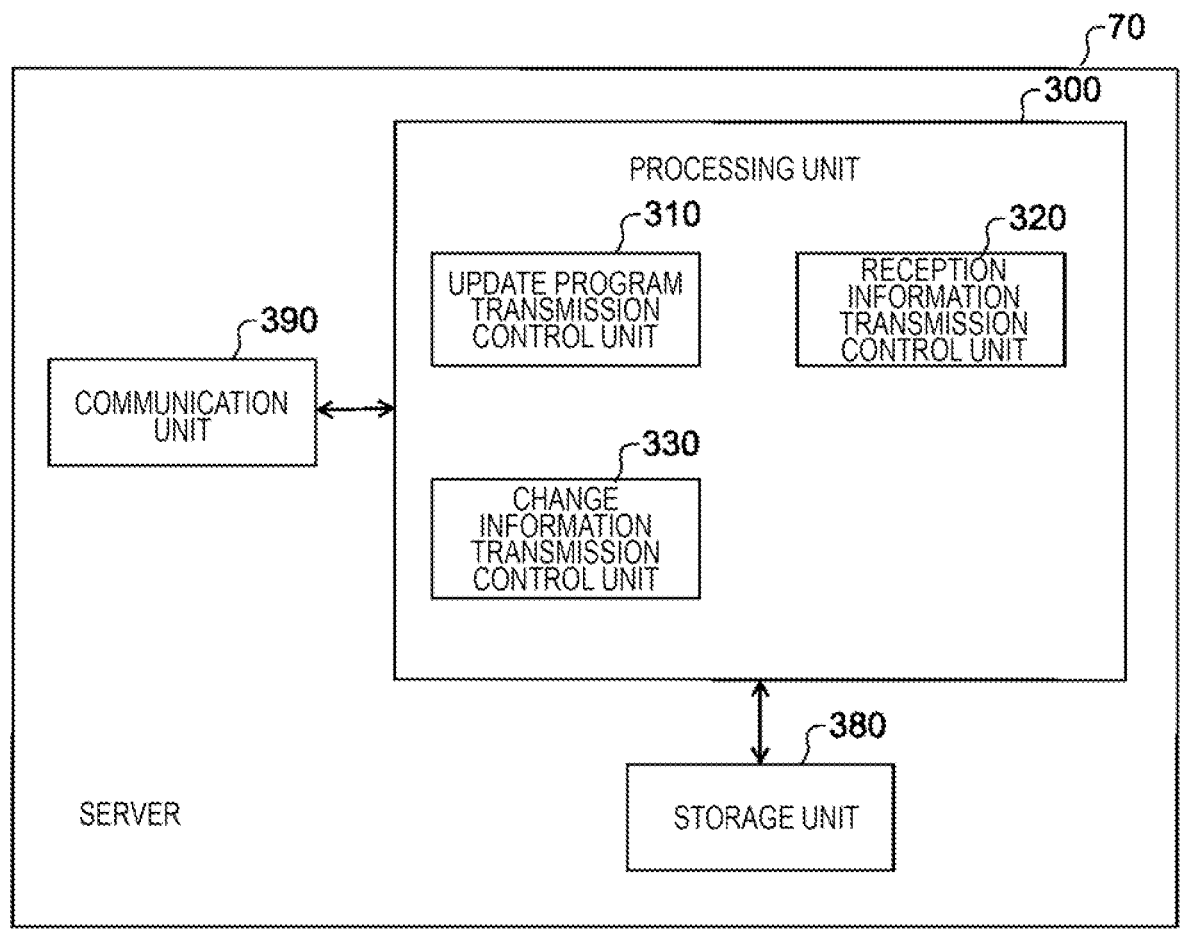
FIG. 2 schematically shows a system configuration provided to a server 70.

FIG. 2 schematically shows a system configuration provided to the server 70. The server 70 comprises a processing unit 300, a storage unit 380, and a communication unit 390. The processing unit 300 has an update program transmission control unit 310, a reception information transmission control unit 320, and a change information transmission control unit 330.

The processing unit 300 is implemented, for example, by an arithmetic processing apparatus including a processor. The storage unit 380 is implemented with a non-volatile storage medium. The processing unit 300 is configured to perform processing by using information stored in the storage unit 380. The communication unit 390 is responsible for communication with the control system 200.

The update program transmission control unit 310 is configured to perform control of transmitting, to the vehicle 20, an update program of the ECU provided to the vehicle 20. The update program is stored in the storage unit 380. The update program transmission control unit 310 is configured to cause the update program stored in the storage unit 380 to be transmitted to the vehicle 20 by controlling the communication unit 390.

The reception information transmission control unit 320 is configured to perform control of transmitting the reception information, which indicates the communication manner by which the vehicle 20 receives the update program for each update program, to the vehicle 20. The reception information is stored in the storage unit 380 in association with the update program. The reception information transmission control unit 320 is configured to perform control of transmitting the reception information associated with the update program to the vehicle 20, before the update program is transmitted to the vehicle 20. The reception information transmission control unit 320 is configured to cause the reception information to be transmitted to the vehicle 20 by controlling the communication unit 390.

The change information transmission control unit 330 is configured, when the vehicle 20 has not received both a first update program and a second update program that is received after update by the first update program is executed, to perform control of transmitting information about change of reception information of the first update program to the vehicle 20. The information about change is, for example, communication manner change information to the effect to change a communication manner. The communication manner change information may be specified by an administrator of the server 70. The change information transmission control unit 330 is configured to cause the communication manner change information to be transmitted to the vehicle 20 by controlling the communication unit 390.

Figure 3:
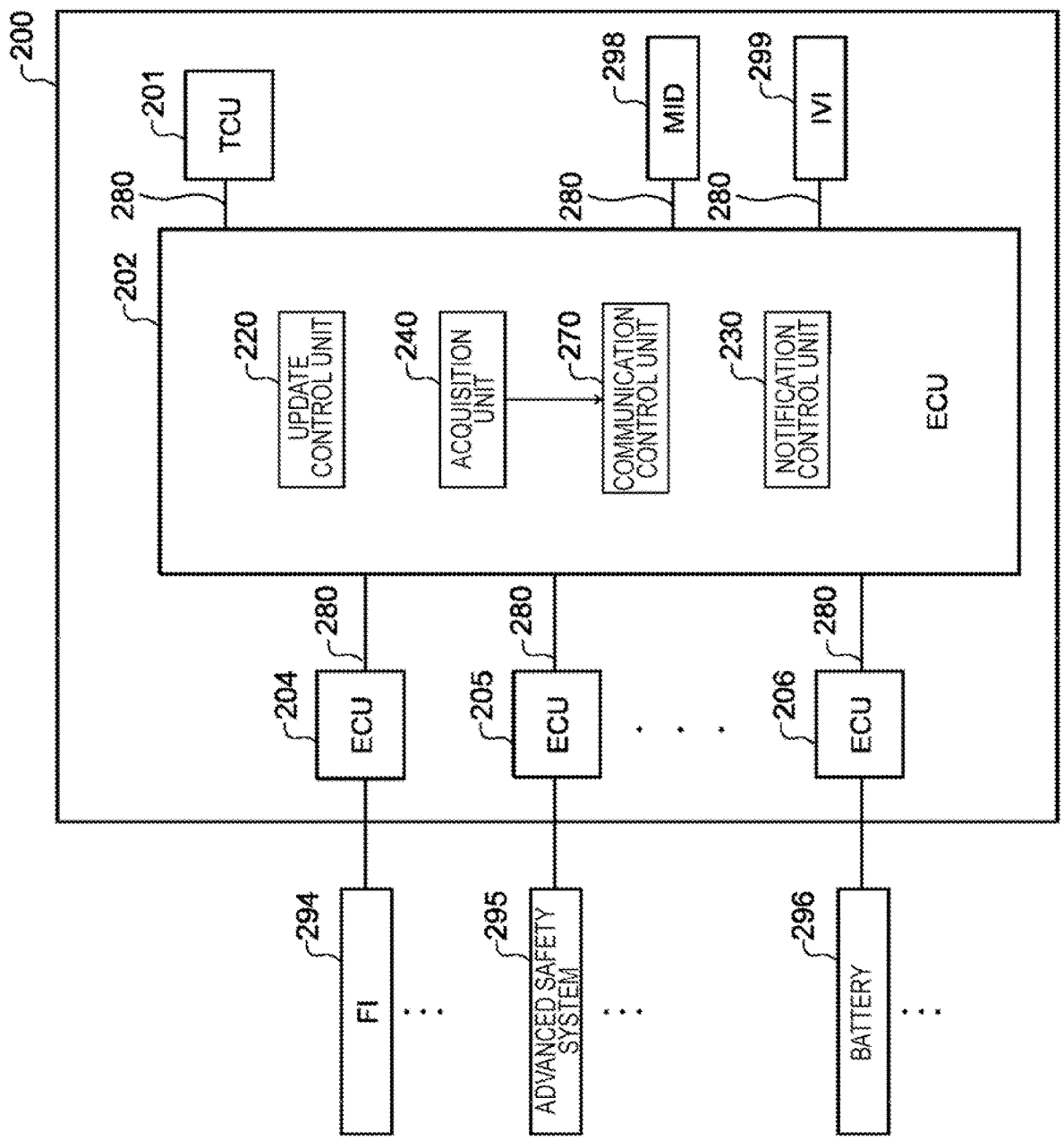
FIG. 3 schematically shows a system configuration provided to a control system 200.

FIG. 3 schematically shows a system configuration provided to the control system 200. The control system 200 comprises a TCU 201, an ECU 202, an ECU 204, an ECU 205, an ECU 206, an MID 298, and an IVI 299. In FIG. 2, an FI 294, an advanced safety system 295, and a battery 296 are examples of the to-be-controlled device in the vehicle 20.

The ECU 202 is connected to the TCU 201, the ECU 204, the ECU 205 and the ECU 206 via an in-vehicle communication line 280. The ECU 202 is configured to mutually communicate with the TCU 201, the ECU 204, the ECU 205, the ECU 206, the MID 298 and the WI 299 via the in-vehicle communication line 280. The ECU 202 is configured to collectively control the TCU 201, the ECU 204, the ECU 205, the ECU 206, the MID 298 and the IVI 299. The in-vehicle communication line 280 may be configured to include a CAN (Controller Area Network), an Ether Network and the like, for example.

The TCU 201 is a telematics control unit. The TCU 201 is mainly responsible for mobile communication. The TCU 201 is configured to transmit and receive data to and from the server 70, based on control of the ECU 202. The TCU 201 is configured to receive the update program transmitted from the server 70 by mobile communication, based on control of the ECU 202. The TCU 201 can function as a wireless communication unit.

The MID 298 is a multi-information display. The IVI 299 is, for example, an in-vehicle infotainment information device (IVI). The MID 298 and the IVI 299 can function as a display control unit. The IVI 299 has a wireless LAN communication function. The IVI 299 is configured to receive the update program transmitted from the server 70 by wireless LAN communication, based on control of the ECU 202.

The ECU 204, the ECU 205 and the ECU 206 are each an ECU as a vehicle control unit configured to control the vehicle 20. The ECU 204, the ECU 205 and the ECU 206 are examples of the 'mobile object control unit'. The ECU 204, the ECU 205 and the ECU 206 are configured to control a variety of devices provided to the vehicle 20. For example, the ECU 204 is configured to control the FI 294, which is a fuel injection apparatus, and the like. The ECU 205 is configured to control the advanced safety system 295, and the like. The advanced safety system 295 is, for example, a battery configured to accumulate electric power that is supplied to a traveling motor provided to the vehicle 20. The ECU 206 is configured to control the battery 296, and the like. The battery 296 functions as a 12V power supply for a vehicle, for example. The battery 296 is, for example, a lead storage battery or the like.

In the present embodiment, the system configuration where the control system 200 comprises the TCU 201, the ECU 202, the ECU 204, the ECU 205, the ECU 206, the MID 298 and the IVI 299 is exemplified. However, the system configuration of the control system 200 is not limited to the example of the present embodiment. In addition, in the present embodiment, as an example, it is described that the mobile object control unit that may be a target of the program update is the ECU 204 and the ECU 205 and the ECU 202 functions as an update control unit configured to control the program update. Note that, the mobile object control unit that may be a target of the program update is not limited to these ECUs. The mobile object control unit that may be a target of the program update may be any of the TCU 201, the ECU 202, the ECU 204, the ECU 205, the ECU 206, the MID 298 and the IVI 299.

The ECU 202 has an update control unit 220, a notification control unit 230, an acquisition unit 240, and a communication control unit 270.

The update control unit 220 is configured to control reception of an update program of the ECU from the server, and to control update of the ECU by the update program The acquisition unit 240 is configured to acquire the reception information indicating a communication manner for receiving the update program from the server for each update program. The communication control unit 270 is configured to perform control of receiving the update program from the server, based on the reception information.

The acquisition unit 240 is configured, when both a first update program and a second update program that is received after update by the first update program is executed have not been received, to acquire information about change of reception information of the first update program. For example, the acquisition unit 240 is configured to acquire the communication manner change information transmitted from the server 70. The communication control unit 270 is configured to perform control of receiving the first update program based on the information about change acquired by the acquisition unit 240.

In a case where the reception information regarding the first update program indicates a communication manner other than mobile communication, as a communication manner for receiving the first update program, the information about change may be information indicating that mobile communication is allowed as a communication manner for receiving the first update program. When the information about change is acquired, the communication control unit 270 is configured to perform control of receiving the first update program by mobile communication.

The reception information regarding the second update program may include information indicating an upper limit value of an amount of data that is allowed to be received by mobile communication. In a case where the acquisition unit 240 acquires the information about change, when an amount of data of the second update program exceeds the upper limit value, the communication control unit 270 may be configured to perform control of receiving the first update program by mobile communication and perform control of receiving the second update program by a communication manner other than mobile communication.

The reception information regarding the second update program may further include information indicating a degree of importance of the second update program. In a case where the acquisition unit 240 acquires the information about change, when a degree of importance of the second update program is equal to or greater than a predetermined reference value and an amount of data of the second update program exceeds the upper limit value, the communication control unit 270 may be configured to perform control of receiving the first update program by mobile communication and perform control of receiving the second update program by a communication manner other than mobile communication.

The reception information regarding the second update program may include the information indicating a degree of importance of the second update program and the information indicating an upper limit value of an amount of data that is allowed to be received by mobile communication. In a case where the acquisition unit 240 acquires the information about change, when a degree of importance of the second update program is less than a predetermined reference value and a summed amount of data of one or more of the first update programs exceeds the upper limit value, the communication control unit 270 may be configured to perform control of receiving the first update program by a communication manner other than mobile communication.

The reception information regarding the first update program may include information indicating a degree of importance of each first update program. In a case where the acquisition unit 240 acquires the information about change, when a degree of importance of the second update program is less than a predetermined reference value, there is no update program having a degree of importance equal to or greater than the predetermined reference value in the first update programs, and the summed amount of data of the first update programs exceeds the upper limit value, the communication control unit 270 may be configured to perform control of receiving the first update program by a communication manner other than mobile communication.

When the control of receiving the first update program by a communication manner other than mobile communication is performed, the notification control unit 230 is configured to cause a user to be notified to receive the first update program by wireless LAN communication. The user is, for example, a passenger in the vehicle 20. For example, the notification control unit 230 may be configured to cause the MID 298 and the IVI 299 to execute the notification to the user.

Here, the program update is described. Program update processing that is executed when a device that is a target of the program update is an ECU and a memory for firmware storage of the ECU is a single bank memory (so-called single-sided ROM) is described. In this case, since a program storage area for firmware storage of the ECU is one, the update program cannot be written to the program storage area when the ECU is operating according to a program stored in the program storage area. When performing the program update of the ECU, the update control unit 220 is configured to transfer the update program to the ECU, to cause the update program to be stored in a predetermined data storage area of the ECU, and thereafter, to instruct the ECU for the program update. When the program update is instructed, the ECU is configured to execute a control code for performing program update, to write the update program transferred to the data storage area to the program storage area, and to activate the update program. The activation of the update program includes, for example, processing of setting an activation parameter of the ECU so as to start control based on the update program by loading the update program at the time of activation of the ECU.

Next, program update processing that is executed when an internal memory of the ECU is a double bank memory (so-called double-sided ROM) is described. In this case, since the ECU has two program storage areas for firmware storage, the update program can be written to a second program storage area when the ECU is operating according to a program stored in a first program storage area. That is, by so-called backside writing, the update program can be written to the second program storage area that is a backside. Therefore, for example, even when the vehicle 20 is traveling, the update program can be written to the second program storage area. For this reason, when the update control unit 220 transfers the update program to the ECU, the update control unit instructs the ECU to write the update program to the second program storage area. When the writing of the update program to the second program storage area of the ECU is completed, the program update of the ECU can be made. When the update control unit 220 performs the program update of the ECU, the update control unit 220 instructs the ECU to activate the update program written to the second program storage area. The activation of the update program includes, for example, processing of setting an activation parameter of the ECU so as to start control based on the update program by loading the update program stored in the second program storage area at the time of activation of the ECU. For example, the activation of the update program includes processing of enabling the second program storage area as a program reading area and disabling the first program storage area as a program reading area. Like this, the 'program update' is a concept that includes instructing to write the update program to the program storage area of the ECU. In addition, the 'program update' is a concept that includes instructing to activate the update program written to the program storage area.

In the program update of the ECU having a single bank memory, there occurs a possibility that the ECU cannot control the vehicle during a period for which the update program is written to the program storage area and during a period for which the update program is activated. On the other hand, in the program update of the ECU having a double bank memory, the ECU can control the vehicle during a period for which the update program is written to the program storage area of a backside.

FIG. 4 shows a data structure of reception information, which is transmitted to the vehicle 20 by the server 70, in a table form. When an update program for the vehicle 20 is present, the server 70 is configured to transmit change information to the vehicle 20 so as to notify the vehicle 20 of the presence of the update program. The server 70 is configured to transmit the change information to the vehicle 20 before transmitting the update program to the vehicle 20.

The reception information includes 'degree of importance', 'communication manner', 'upper limit value' and 'size'. The 'PID' is identification information of the update program. The 'degree of importance' is information indicative of a degree of importance of the update program. The degree of importance shall be indicated by a numerical value from 0 to 2. The degree of importance '0' indicates that the degree of importance is the lowest, and the degree of importance '2' indicates that the degree of importance is the highest.

The 'communication manner' is information indicative of a communication manner for receiving the update program. The 'upper limit value' indicates an upper limit value of an amount of data by which the update program can be received by mobile communication. The processing using the upper limit value will be described in relation to FIG. 11 and the like. The 'size' is a program size of the update program. The 'size' may be information indicative of an amount of data of the update program.

Figure 5:
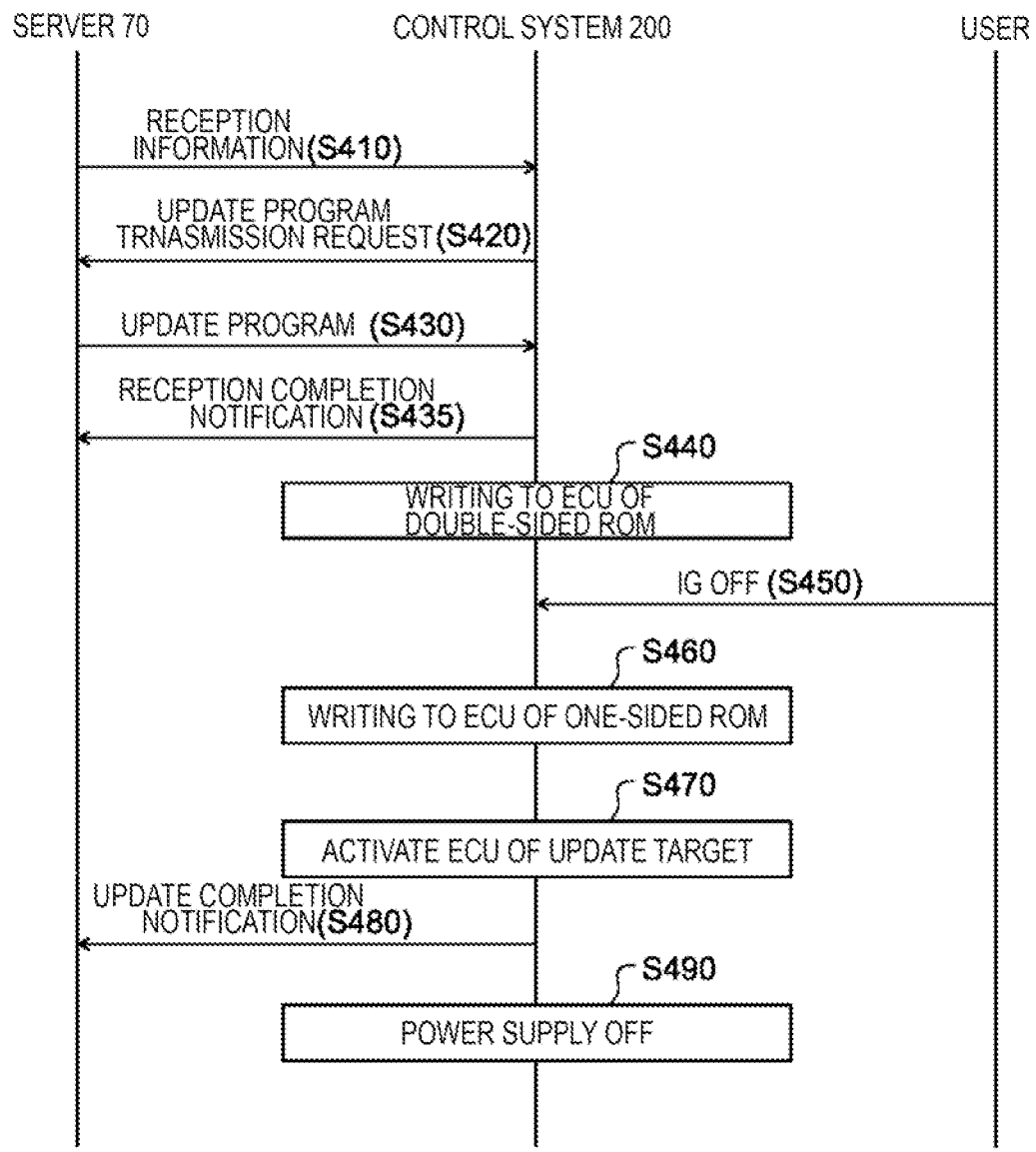
FIG. 5 shows an execution sequence relating to program update processing.

FIG. 5 shows an execution sequence relating to program update processing. In S410, when an update program that should be applied to the ECU of the control system 200 of the vehicle 20 is present, the server 70 transmits the reception information associated with the update program to the control system 200. The acquisition unit 240 acquires the reception information transmitted from the server 70.

Here, it is assumed that the acquisition unit 240 has received the reception information shown in FIG. 4. In addition, it is assumed that 'P1' in FIG. 4 is identification information indicative of an update program of the ECU 205 and 'P2' is identification information indicative of an update program of the ECU 204.

In S420, the update control unit 220 transmits, to the server 70, an update program transmission request for requesting transmission of the 'P1' and 'P2' update programs, via the TCU 201. In S430, the update control unit 220 receives the 'P1' and 'P2' update programs, via the TCU 201. When the reception of the 'P1' and 'P2' update programs is completed, the update control unit 220 transmits a reception completion notification, which indicates that the reception of the 'P1' and 'P2' update programs is completed, to the server 70, via the TCU 201, in S435.

In S440, the update control unit 220 transfers the update program for the ECU 205 to the ECU 205 and instructs the ECU to write the update program to the program storage area of a backside. When the writing of the update program to the program storage area of a backside is completed, a state where the update program of the ECU 205 can be activated becomes.

When an IG switch is turned off in S450, the update control unit 220 transfers the update program to the ECU 204 and instructs the ECU to write the update program to the program storage area of the ECU 204, in S460. When the writing of the update program to the program storage area is completed, the update program of the ECU 204 can be activated.

In S470, the update control unit 220 instructs the ECU 204 and the ECU 205 to activate their respective update programs. When the activation of the update programs in the ECU 204 and the ECU 205 is completed, the update control unit 220 transmits an update completion notification, which indicates that the program update by the 'P1' and 'P2' update programs is completed, to the server 70, via the TCU 201 or the IVI 299, in S480. In S490, the update control unit 220 turns off a power supply of the vehicle 20.

FIG. 6 shows a data structure of management information for the server 70 to manage an update program, which is transmitted to the vehicle 20, in a table form. The management information is stored in the storage unit 380.

The management information is a list of the reception information transmitted to the vehicle 20. An arrangement order of the reception information in the management information indicates an order in which the program update should be performed. For example, the management information shown in FIG. 6 indicates that the program update by an update program identified with 'P1' is to be first performed and the program update by an update program identified with 'P4' is to be last performed. The server 70 is configured to store the management information in the storage unit 380 for each vehicle.

Figure 7:
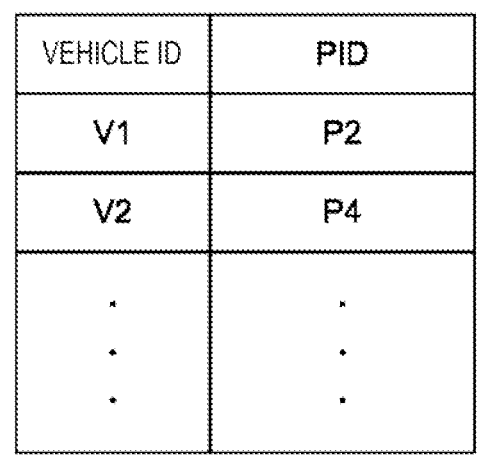

FIG. 7 shows a data structure of completion information for the server 70 to manage a transmission state of the update program in the vehicle 20, in a table form. The completion information is stored in the storage unit 380.

The completion information includes 'vehicle ID' and The 'vehicle ID' is information for identifying a vehicle. The 'PID' is identification information of an update program, which should be last applied, among update programs whose reception has been completed in the vehicle.

For example, according to the completion information of FIG. 7, a vehicle identified with a vehicle ID 'V1' indicates that reception of a 'P2' update program is completed. A vehicle identified with a vehicle ID 'V2' indicates that reception of a 'P4' update program is completed. Referring to the management information shown in FIG. 6, for the vehicle identified with the vehicle ID 'V1', reception of 'P3' and 'P4' update programs is not completed. In addition, for the vehicle identified with the vehicle ID 'V2', there is no update program whose reception is not completed.

FIG. 8 shows a data structure of reception information relating to a new update program for the vehicle 20, which is transmitted by the server 70. As shown in FIG. 8, it is assumed that the new update program is an update program having a degree of importance '1'. In the server 70, the change information transmission control unit 330 is configured to refer to the completion information stored in the storage unit 380 to determine whether to transmit the communication manner change information.

For example, for the vehicle identified with the vehicle ID 'V1', the reception of the 'P3' and 'P4' update programs is not completed. In addition, for the 'P3' update program, reception via wireless LAN ('WLAN') is specified. For this reason, since the vehicle identified with 'V1' receives the 'P3' update program only at a place where wireless LAN communication is possible, the program update by the 'P3' and 'P4' update programs may be delayed. This may cause the program update by the 'P5' update program to be further delayed. Therefore, when it is necessary to transmit the reception information of the 'P5' new update program to the vehicle identified with 'V1', the change information transmission control unit 330 is configured to transmit the communication manner change information to the vehicle identified with 'V1'. On the other hand, in the vehicle identified with the vehicle ID 'V2', there is no update program whose reception is not completed. Therefore, the change information transmission control unit 330 does not transmit the communication manner change information to the vehicle identified with 'V2'. The change information transmission control unit 330 may be configured to determine that it is necessary to change the communication manner of the update program when a summed value of sizes of unreceived update programs in the vehicle exceeds a predetermined value.

Figure 9:
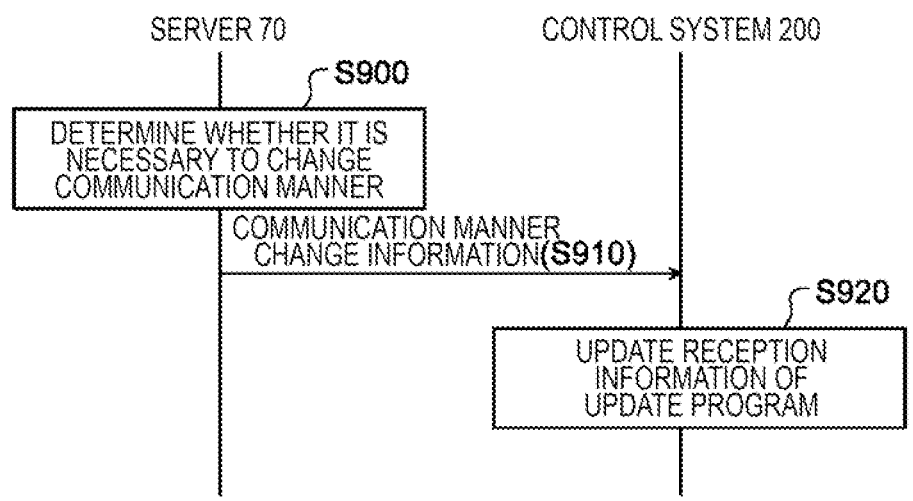
FIG. 9 shows an execution sequence relating to transmission of communication manner change information.

FIG. 9 shows an execution sequence relating to transmission of communication manner change information. When a new update program for the vehicle 20 is present, the change information transmission control unit 330 of the server 70 determines whether it is necessary to change the communication manner of the update program in the vehicle 20, in S900.

Specifically, as described in relation to FIG. 8, when an update program for which 'WLAN' is set as the communication manner is present in update programs not received by the vehicle 20, the change information transmission control unit 330 determines that it is necessary to change the communication manner of the update program. When the change information transmission control unit 330 determines that it is necessary to change the communication manner of the update program, the change information transmission control unit causes the communication manner change information to be transmitted to the vehicle 20 through the communication unit 390, in S910. The communication manner change information will be described in relation to FIG. 10. In S920, when the acquisition unit 240 of the control system 200 acquires the communication manner change information transmitted from the server 70, the reception information of the update program is updated.

FIG. 10 shows an example of the communication manner change information, in a table form. The communication manner change information is a list of the reception information relating to update programs not received by the vehicle 20. In the communication manner change information, 'P3' and 'P4' are identification information of update programs not received by the vehicle 20, and 'P5' is identification information of a new update program. As shown in FIG. 6, in the reception information of the 'P3' update program transmitted in the past, 'WLAN' was specified as the communication manner. In contrast, in the communication manner change information that is newly transmitted to the vehicle 20, the communication manner for receiving the 'P3' update program has been changed to 'not specified'. In the vehicle 20, the communication control unit 270 can receive the 'P3' update program from the server 70 via the TCU 201, according to the communication manner specified in the communication manner change information.

Figure 11:
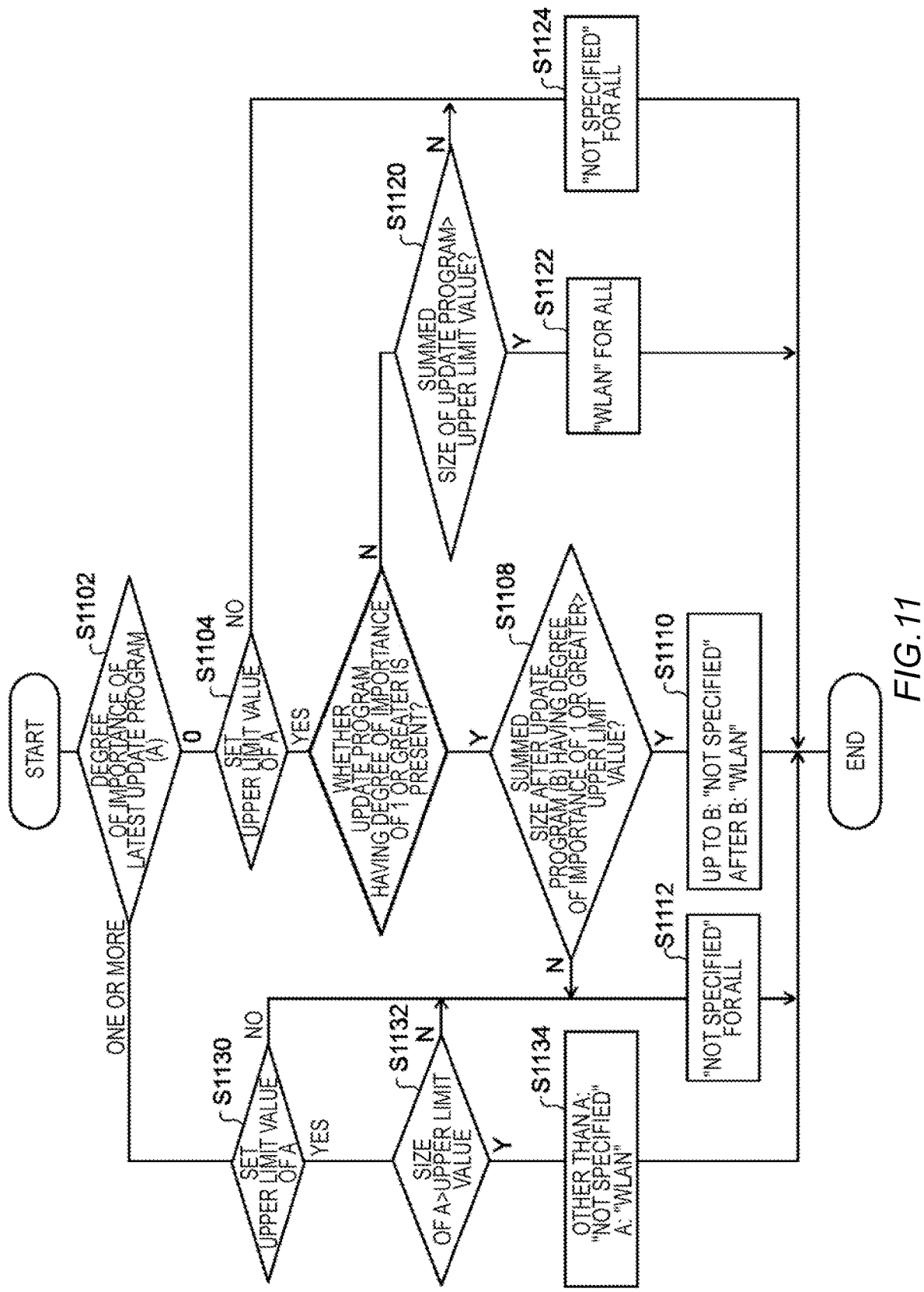
FIG. 11 is a flowchart showing an example of an execution procedure of processing relating to change of a communication manner, which is executed on the server 70.

FIG. 11 is a flowchart showing an example of an execution procedure of processing relating to change of a communication manner, which is executed on the server 70. The processing of the flowchart shown in FIG. 11 is executed when it is determined that it is necessary to change the communication manner of the update program when newly transmitting an update program. The processing of the flowchart shown in FIG. 11 is processing for setting a communication manner for receiving each update program included in the communication manner change information.

In S1102, it is determined whether a degree of importance of the new update program (referred to as 'update program A') is equal to or greater than 1. When the degree of importance of the update program A is equal to or greater than 1, it is determined in S1130 whether an upper limit value of an amount of data allowed to be received by mobile communication (simply referred to as 'upper limit value') is set for the update program A. When the upper limit value is set for the update program A, it is determined in S1132 whether a size of the update program A exceeds the upper limit value. When the size of the update program A exceeds the upper limit value, in S1134, 'not specified' is set for the communication manner other than the update program A, and 'WLAN' is set for the communication manner of the update program A. This allows the vehicle 20 to early receive an update program before the update program A.

When it is determined in S1132 that the upper limit value has not been set for the update program A, 'not specified' is set for the communication manner of all the update programs, in S1112. In addition, when it is also determined in S1130 that the upper limit value is set for the update program A, the flow proceeds to S1112. This allows the vehicle 20 to early receive an important update program.

In S1102, when the degree of importance of the update program A is 0, it is determined in S1104 whether the upper limit value is set for the update program. When the upper limit value is set for the update program A, it is determined in S1106 whether an update program having a degree of importance of 1 or greater is present in the unreceived update programs. When the update program having a degree of importance of 1 or greater is present in the unreceived update programs, it is determined in S1108 whether a summed size of update programs that should be applied after the latest update program having a degree of importance of 1 or greater (referred to as 'update program B') exceeds the upper limit value. When the summed size of update programs that should be applied after the update program B exceeds the upper limit value, 'not specified' is set for the communication manner of the update programs up to the update program B and 'WLAN' is set for the communication manner of the update programs after the update program B, in S1110. When it is determined in S1108 that the summed size of update programs that should be applied after the update program B does not exceed the upper limit value, the flow proceeds to S1112. This allows the vehicle 20 to early receive the update programs up to at least the update program B.

When it is determined in S1106 that the update program having a degree of importance of 1 or greater is not present in the unreceived update programs, it is determined in S1120 whether a summed size of all the update programs exceeds the upper limit value. When the summed size of all the update programs exceeds the upper limit value, 'WLAN' is set as the communication manner of all the update programs, in S1122. Thereby, it is possible to suppress the update programs having a less degree of importance from being received by mobile communication while exceeding the upper limit value. When the summed size of all the update programs does not exceed the upper limit value, 'not specified' is set as the communication manner of all the update programs, in S1124. This allows the update programs to be early received within a range of the upper limit value. Therefore, when an important update program is transmitted later, a possibility that the important update program can be promptly received increases. In addition, when it is also determined in S1104 that the upper limit value has not been set for the update program A, the flow proceeds to S1124. This allows the vehicle 20 to early receive the unreceived update program.

As described above, according to the update system 10 of the present embodiment, the server 70 can instruct the vehicle 20 to change the communication manner for receiving the unreceived update program in the vehicle 20. When the change of the communication manner is specified, the vehicle 20 receives the update program for which 'WLAN' is specified as the communication manner, by mobile communication. This allows the vehicle 20 to promptly apply the update program.

Note that, the aspect where the server 70 transmits the communication manner change information to the vehicle 20 has been described in relation to FIGS. 10 and 11. However, instead of the aspect where the communication manner change information is transmitted to the vehicle 20, an aspect where the server 70 transmits information, which indicates that the communication manner is to be changed, and the reception information of the latest update program to the vehicle 20 may be adopted. In this aspect, the communication control unit 270 of the vehicle 20 may be configured to set the communication manner of the update program according to the flowchart shown in FIG. 11.

The vehicle 20 is a vehicle as an example of transportation equipment. The vehicle may be an automobile such as an automobile having an internal combustion engine, an electric vehicle and a fuel cell vehicle (FCV). The automobile includes a bus, a truck, a two-wheeled vehicle and the like. The vehicle may be a saddle-type vehicle or the like, and may be a motorcycle. The transportation equipment includes equipment such as an airplane including an unmanned aerial vehicle and a ship, in addition to the vehicle. The transportation equipment may any equipment configured to transport people or goods. The transportation equipment is an example of the mobile object. The mobile object is not limited to the transportation equipment and may be any movable equipment.

Figure 12:
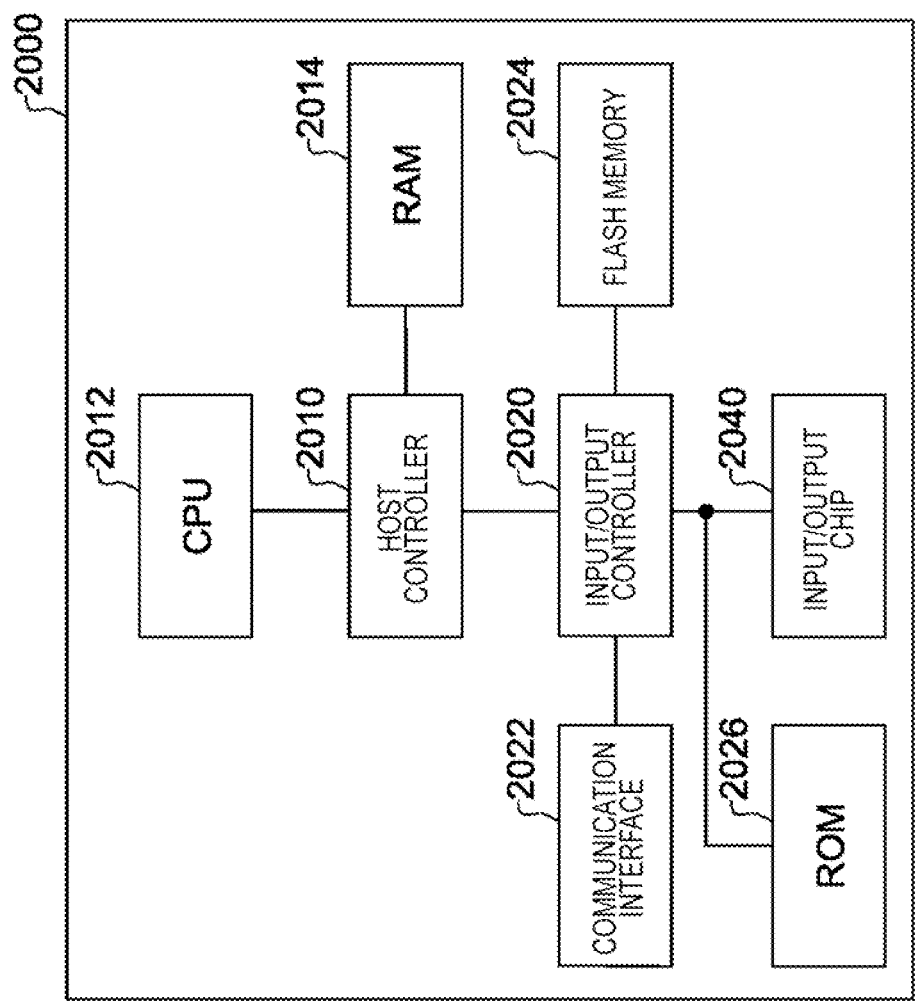
FIG. 12 shows an example of a computer 2000.

FIG. 12 illustrates an example of a computer 2000 where a plurality of embodiments of the present invention may be entirely or partially embodied. A program that is installed in the computer 2000 can cause the computer 2000 to function as a system such as the control system of the embodiment or each unit of the system or as an apparatus such as the server or each unit of the apparatus, to execute operations associated with the system or each unit of the system or the apparatus or each unit of the apparatus, and/or to execute the process of the embodiment or steps thereof. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 is configured to operate according to programs stored in the ROM 2026 and the RAM 2014, thereby controlling each unit.

The communication interface 2022 is configured to communicate with other electronic devices via a network. The flash memory 2024 is configured to store a program and data that are used by the CPU 2012 in the computer 2000. The ROM 2026 is configured to store a boot program or the like that is executed by the computer 2000 at the time of activation, and/or a program depending on hardware of the computer 2000. The input and output chip 2040 may also be configured to connect various input and output units such as a keyboard, a mouse, and a monitor, to the input and output controller 2020 via input and output ports such as a serial port, a parallel port, a keyboard port, a mouse port, a monitor port, a universal serial bus (USB) port and a high-definition multimedia interface (HDMI (registered trademark)) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and is executed by the CPU 2012. Information processing described in these programs is read into the computer 2000, resulting in cooperation between the programs and the various types of hardware resources described above. An apparatus or a method may be constituted by realizing operation or processing of information according to a use of the computer 2000.

For example, when communication is performed between the computer 2000 and an external device, the CPU 2012 may be configured to execute a communication program loaded onto the RAM 2014 to instruct communication processing to the communication interface 2022, based on processing described in the communication program. The communication interface 2022 is configured, under control of the CPU 2012, to read transmission data stored on a transmission buffer processing region provided in a recording medium such as the RAM 2014 and the flash memory 2024, to transmit the read transmission data to the network, and to write reception data received from the network to a reception buffer processing region or the like provided on the recording medium.

In addition, the CPU 2012 may be configured to cause all or a necessary portion of a file or a database, which has been stored in a recording medium such as the flash memory 2024, to be read into the RAM 2014, thereby executing various types of processing on the data on the RAM 2014. Next, the CPU 2012 is configured to write the processed data back to the recording medium.

Various types of information, such as various types of programs, data, tables, and databases, may be stored in the recording medium and may be subjected to information processing. The CPU 2012 may be configured to execute, on the data read from the RAM 2014, various types of processing including various types of operations, processing of information, conditional judgment, conditional branching, unconditional branching, search and replacement of information, and the like described in the present specification and specified by instruction sequences of the programs, and to write a result back to the RAM 2014. The CPU 2012 may also be configured to search for information in a file, a database, etc. in the recording medium. For example, when a plurality of entries, each having an attribute value of a first attribute associated with an attribute value of a second attribute, is stored in the recording medium, the CPU 2012 may be configured to search for an entry having a designated attribute value of the first attribute that matches a condition from the plurality of entries, and to read the attribute value of the second attribute stored in the entry, thereby obtaining the attribute value of the second attribute associated with the first attribute that satisfies a predetermined condition.

The programs or software modules described above may be stored in a computer-readable storage medium on or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program that is installed in the computer 2000 and causes the computer 2000 to function as the control system 200 may work on the CPU 2012 and the like to cause the computer 2000 to function as each unit of the control system 200, respectively. Information processing described in these programs are read into the computer 2000 to cause the computer to function as each unit of the control system 200, which is a specific means realized by cooperation of software and the various types of hardware resources described above. Then, with these specific means, by realizing computing or processing of information according to an intended use of the computer 2000 in the present embodiment, the specific control system 200 is constructed according to the intended use.

A program that is installed in the computer 2000 and causes the computer 2000 to function as the server 70 may work on the CPU 2012 and the like to cause the computer 2000 to function as each unit of the server 70, respectively. Information processing described in these programs are read into the computer 2000 to cause the computer to function as each unit of the server 70, which is a specific means realized by cooperation of software and the various types of hardware resources described above. Then, with these specific means, by realizing computing or processing of information according to an intended use of the computer 2000 in the present embodiment, the specific server 70 is constructed according to the intended use.

Various embodiments have been described with reference to the block diagrams and the like. In the block diagrams, each block may represent (1) a step of a process in which an operation is executed, or (2) each unit of an apparatus having a role in executing the operation. Certain steps and each unit may be implemented by dedicated circuitry, programmable circuitry supplied with computer-readable instructions stored on computer-readable storage media, and/or processors supplied with computer-readable instructions stored on computer-readable storage media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable storage media may include any tangible device that can store instructions to be executed by a suitable device, and as a result, the computer-readable storage medium having the instructions stored thereon constitutes at least a part of an article of manufacture including instructions which can be executed to provide means for performing operations specified in the processing procedures or block diagrams. Examples of the computer-readable storage media may include an electronic storage medium, a magnetic storage medium, an optical storage medium, an electromagnetic storage medium, a semiconductor storage medium, and the like. More specific examples of the computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as the "C" programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc. and the computer-readable instructions may be executed to provide means for performing operations specified in the described processing procedures or block diagrams. Examples of processors include computer processors, processing units, microprocessors, digital signal processors, controllers, microcontrollers, and the like.

While the present invention has been described using the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: update system
20: vehicle
70: server
90: communication network
200: control system
201: TCU
202: ECU
204: ECU
205: ECU
206: ECU
220: update control unit
230: notification control unit
240: acquisition unit 270: communication control unit
280: in-vehicle communication line
294: FI
295: advanced safety system
296: battery
298: MID
299: IVI
300: processing unit
310: update program transmission control unit
320: reception information transmission control unit
330: change information transmission control unit
380: storage unit
390: communication unit
2000: computer
2010: host controller
2012: CPU
2014: RAM
2020: input and output controller
2022: communication interface
2024: flash memory
2026: ROM
2040: input and output chip

What is claimed is:

1. A control system comprising:
a mobile object control unit configured to control a mobile object;
an update control unit configured to control reception of an update program of the mobile object control unit from a server and to control update of the mobile object control unit by the update program;
an acquisition unit configured to acquire reception information indicating a communication manner for receiving the update program from the server for each update program; and
a communication control unit configured to perform control of receiving the update program from the server, based on the reception information, wherein
the acquisition unit is configured, when both a first update program and a second update program that is received after update by the first update program is executed have not been received, to acquire information about change of reception information of the first update program, and
the communication control unit is configured to perform control of receiving the first update program based on the information about change acquired by the acquisition unit.

2. The control system according to claim 1, wherein
the reception information regarding the first update program indicates a communication manner other than mobile communication, as a communication manner for receiving the first update program,
the information about change is information indicating that mobile communication is allowed as a communication manner for receiving the first update program, and
when the information about change is acquired, the communication control unit is configured to perform control of receiving the first update program by mobile communication.

3. The control system according to claim 2, wherein
the reception information regarding the second update program includes information indicating an upper limit value of an amount of data that is allowed to be received by mobile communication, and
in a case where the acquisition unit acquires the information about change, when an amount of data of the second update program exceeds the upper limit value, the communication control unit is configured to perform control of receiving the first update program by mobile communication and to perform control of receiving the second update program by a communication manner other than mobile communication.

4. The control system according to claim 3, wherein
the reception information regarding the second update program further includes information indicating a degree of importance of the second update program, and
in a case where the acquisition unit acquires the information about change, when the degree of importance of the second update program is equal to or greater than a predetermined reference value and the amount of data of the second update program exceeds the upper limit value, the communication control unit is configured to perform control of receiving the first update program by mobile communication and to perform control of receiving the second update program by a communication manner other than mobile communication.

5. The control system according to claim 2, wherein
the reception information regarding the second update program includes information indicating a degree of importance of the second update program and information indicating an upper limit value of an amount of data that is allowed to be received by mobile communication, and
in a case where the acquisition unit acquires the information about change, when the degree of importance of the second update program is less than a predetermined reference value and a summed amount of data of one or more of the first update programs exceeds the upper limit value, the communication control unit is configured to perform control of receiving the first update program by a communication manner other than mobile communication.

6. The control system according to claim 5, wherein
the reception information regarding the first update program includes information indicating a degree of importance of each first update program, and
in a case where the acquisition unit acquires the information about change, when the degree of importance of the second update program is less than the predetermined reference value, there is no update program having a degree of importance equal to or greater than the predetermined reference value in the first update programs, and the summed amount of data of the first update programs exceeds the upper limit value, the communication control unit is configured to perform control of receiving the first update program by a communication manner other than mobile communication.

7. The control system according to claim 6, further comprising a notification control unit configured, when the control of receiving the first update program by a communication manner other than mobile communication is performed, to cause a user to be notified to receive the first update program by wireless LAN communication.

8. The control system according to claim 3, wherein
the reception information regarding the second update program includes information indicating a degree of importance of the second update program and information indicating an upper limit value of an amount of data that is allowed to be received by mobile communication, and in a case where the acquisition unit acquires the information about change, when the degree of importance of the second update program is less than a predetermined reference value and a summed amount of data of one or more of the first update programs exceeds the upper limit value, the communication control unit is configured to perform control of receiving the first update program by a communication manner other than mobile communication.

9. The control system according to claim 4, wherein
the reception information regarding the second update program includes information indicating a degree of importance of the second update program and information indicating an upper limit value of an amount of data that is allowed to be received by mobile communication, and in a case where the acquisition unit acquires the information about change, when the degree of importance of the second update program is less than a predetermined reference value and a summed amount of data of one or more of the first update programs exceeds the upper limit value, the communication control unit is configured to perform control of receiving the first update program by a communication manner other than mobile communication.

10. The control system according to claim 8, wherein
the reception information regarding the first update program includes information indicating a degree of importance of each first update program, and in a case where the acquisition unit acquires the information about change, when the degree of importance of the second update program is less than the predetermined reference value, there is no update program having a degree of importance equal to or greater than the predetermined reference value in the first update programs, and the summed amount of data of the first update programs exceeds the upper limit value, the communication control unit is configured to perform control of receiving the first update program by a communication manner other than mobile communication.

11. The control system according to claim 9, wherein
the reception information regarding the first update program includes information indicating a degree of importance of each first update program, and in a case where the acquisition unit acquires the information about change, when the degree of importance of the second update program is less than the predetermined reference value, there is no update program having a degree of importance equal to or greater than the predetermined reference value in the first update programs, and the summed amount of data of the first update programs exceeds the upper limit value, the communication control unit is configured to perform control of receiving the first update program by a communication manner other than mobile communication.

12. The control system according to claim 10, further comprising a notification control unit configured, when the control of receiving the first update program by a communication manner other than mobile communication is performed, to cause a user to be notified to receive the first update program by wireless LAN communication.

13. The control system according to claim 11, further comprising a notification control unit configured, when the control of receiving the first update program by a communication manner other than mobile communication is performed, to cause a user to be notified to receive the first update program by wireless LAN communication.

14. A mobile object comprising the control system according to claim 1.

15. The mobile object according to claim 14, wherein the mobile object is a vehicle.

16. A server comprising:
an update program transmission control unit configured to perform control of transmitting an update program of a mobile object control unit provided to a mobile object to the mobile object;
a reception information transmission control unit configured to perform control of transmitting reception information, which indicates a communication manner by which the mobile object receives the update program for each update program, to the mobile object; and
a change information transmission control unit configured, when the mobile object has not received both a first update program and a second update program that is received after update by the first update program is executed, to perform control of transmitting information about change of reception information of the first update program to the mobile object.

17. A control method comprising:
controlling reception of an update program of a mobile object control unit configured to control a mobile object from a server;
acquiring reception information indicating a communication manner for receiving the update program from the server for each update program;
performing control of receiving the update program from the server, based on the reception information;
controlling update of the mobile object control unit by the update program;
acquiring information about change of reception information of a first update program when both a first update program and a second update program that is received after update by the first update program is executed have not been received; and
performing control of receiving the first update program based on the information about change acquired in the acquiring.

18. A control method comprising:
performing control of transmitting an update program of a mobile object control unit provided to a mobile object to the mobile object;
performing control of transmitting reception information, which indicates a communication manner by which the mobile object receives the update program for each update program, to the mobile object; and
performing control of transmitting information about change of reception information of a first update program to the mobile object when the mobile object has not received both the first update program and a second update program that is received after update by the first update program is executed.

* * * * *